(12) United States Patent
Rowntree et al.

(10) Patent No.: US 8,032,984 B2
(45) Date of Patent: Oct. 11, 2011

(54) VACUUM CLEANER FILTER CLEANING MECHANISMS

(75) Inventors: David Rowntree, Newton Hall (GB); Barry Pears, Langley Moor (GB)

(73) Assignee: Black & Decker Inc., Newark, DE (US)

( * ) Notice: Subject to any disclaimer, the term of this patent is extended or adjusted under 35 U.S.C. 154(b) by 1303 days.

(21) Appl. No.: 11/654,098

(22) Filed: Jan. 17, 2007

(65) Prior Publication Data

US 2007/0186372 A1    Aug. 16, 2007

(30) Foreign Application Priority Data

Jan. 27, 2006    (EP) .................................. 06100994.0

(51) Int. Cl.
*A47L 9/10* (2006.01)
(52) U.S. Cl. ......................................................... 15/352
(58) Field of Classification Search .................... 15/352, 15/353
See application file for complete search history.

(56) References Cited

U.S. PATENT DOCUMENTS

| | | |
|---|---|---|
| 156,288 A | 8/1874 | Hughes |
| 971,044 A | 9/1910 | Hutchinson |
| 1,156,235 A | 10/1915 | Kirby |
| 1,420,665 A | 6/1922 | Newcombe |
| 1,768,617 A | 7/1930 | Lee |
| 2,036,789 A | 4/1936 | Baker |
| 2,198,568 A | 4/1940 | Yonkers, Jr. |
| 2,226,630 A | 12/1940 | McCord |
| 2,242,278 A | 5/1941 | Yonders, Jr. |
| 2,439,182 A | 4/1948 | Nuffer et al. |
| 2,539,195 A | 4/1951 | Lang |
| 2,564,468 A | 4/1951 | Anderson |
| 2,935,158 A | 5/1960 | Braun |
| 3,257,784 A | 6/1966 | Grellson |
| 3,296,781 A | 1/1967 | Schumann |
| 3,339,350 A | 9/1967 | Sims |
| 3,365,864 A | 1/1968 | Lizima |
| 3,465,413 A | 9/1969 | Rosaen et al. |
| 3,486,626 A | 12/1969 | Miyagi et al. |
| 3,524,211 A | 8/1970 | Wolf |
| 3,561,824 A | 2/1971 | Homan |
| 3,731,465 A | 5/1973 | Ohira et al. |
| D231,658 S | 5/1974 | Stauft |
| 3,816,983 A | 6/1974 | Sawada et al. |
| 3,841,067 A | 10/1974 | Kato et al. |
| 3,856,488 A | 12/1974 | Kato et al. |
| 3,861,381 A | 1/1975 | Witman et al. |

(Continued)

FOREIGN PATENT DOCUMENTS

| | | |
|---|---|---|
| DE | 620117 | 11/1935 |
| DE | 630169 | 5/1936 |
| DE | 1768312 | 6/1958 |
| DE | 10 59 636 B | 6/1959 |
| DE | 1874119 | 6/1963 |
| DE | 1959657 | 3/1967 |

(Continued)

*Primary Examiner* — Lee D Wilson
*Assistant Examiner* — Jamal Daniel
(74) *Attorney, Agent, or Firm* — John Yun (57) ABSTRACT

The present invention provides a vacuum cleaner having an inlet (26) for dirty air, an outlet (24) for clean air, and a filter (44) located in fluid communication between the inlet and the outlet. A motor drives a fan for moving air into the inlet and through the filter to the outlet. A filter cleaning mechanism for removing dirt from the filter is provided and is operatively associated with an on/off switch for the fan motor or alternatively a separate user-operated switch, whereby operation of the switch results in operation of the filler cleaning mechanism.

20 Claims, 10 Drawing Sheets

U.S. PATENT DOCUMENTS

| | | | |
|---|---|---|---|
| 3,898,129 A | 8/1975 | Fujimoto et al. |
| 3,898,414 A | 8/1975 | Hawley |
| 3,898,488 A | 8/1975 | Erwin et al. |
| 3,921,250 A | 11/1975 | Jerabek |
| 4,007,026 A | 2/1977 | Groh |
| D247,341 S | 2/1978 | Pelly |
| 4,105,420 A | 8/1978 | Moore |
| 4,209,875 A | 7/1980 | Pugh et al. |
| 4,225,814 A | 9/1980 | Gantz et al. |
| 4,248,613 A | 2/1981 | Linhart |
| 4,304,580 A | 12/1981 | Gehl et al. |
| 4,388,582 A | 6/1983 | Saar et al. |
| 4,392,101 A | 7/1983 | Saar et al. |
| 4,426,211 A | 1/1984 | Ataka et al. |
| D275,427 S | 9/1984 | Kishi et al. |
| 4,533,370 A | 8/1985 | Ikezaki et al. |
| 4,588,464 A | 5/1986 | Miyagi et al. |
| 4,661,129 A | 4/1987 | Nederman |
| 4,716,352 A | 12/1987 | Hurn et al. |
| 4,745,654 A | 5/1988 | Yamamoto et al. |
| 4,746,339 A | 5/1988 | Millard |
| 4,790,306 A | 12/1988 | Braun et al. |
| 4,821,366 A | 4/1989 | Levine |
| D302,876 S | 8/1989 | Ikeda et al. |
| RE33,074 E | 10/1989 | Levine |
| 4,878,930 A | 11/1989 | Manniso et al. |
| 4,920,606 A | 5/1990 | Gerke, Jr. et al. |
| 4,920,608 A | 5/1990 | Hult et al. |
| 4,934,020 A | 6/1990 | Jackson |
| 4,947,514 A | 8/1990 | Gerke, Jr. et al. |
| 4,967,443 A | 11/1990 | Krasznai et al. |
| 1,786,384 A | 12/1990 | Amstutz |
| 5,005,252 A | 4/1991 | Steiner et al. |
| 5,011,058 A | 4/1991 | Sapp et al. |
| 5,020,187 A | 6/1991 | Kosten et al. |
| 5,025,529 A | 6/1991 | Hult et al. |
| 5,035,024 A | 7/1991 | Steiner et al. |
| 5,043,640 A | 8/1991 | Orton |
| 5,065,473 A | 11/1991 | Krasznai et al. |
| 5,074,006 A | 12/1991 | Eremita |
| 5,084,934 A | 2/1992 | Lessig, III et al. |
| 5,092,015 A | 3/1992 | Kosten et al. |
| 5,105,505 A | 4/1992 | Reed, Jr. |
| 5,114,217 A | 5/1992 | Beiser |
| 5,115,538 A | 5/1992 | Cochran et al. |
| D327,342 S | 6/1992 | Leung |
| 5,134,751 A | 8/1992 | Reed, Jr. et al. |
| 5,148,094 A | 9/1992 | Parks et al. |
| 5,199,963 A | 4/1993 | Scarp |
| D337,303 S | 7/1993 | Naft et al. |
| 5,297,311 A | 3/1994 | Puri |
| 5,388,302 A | 2/1995 | Sundaram et al. |
| D357,772 S | 4/1995 | Yuen |
| D371,650 S | 7/1996 | Dingelstad |
| 5,599,401 A | 2/1997 | Brosky et al. |
| 5,611,831 A | 3/1997 | Matsuoka et al. |
| 5,634,238 A | 6/1997 | McCaffrey et al. |
| 5,664,285 A | 9/1997 | Melito et al. |
| 5,699,586 A | 12/1997 | Melito et al. |
| D389,963 S | 1/1998 | Scanlon et al. |
| 5,733,351 A | 3/1998 | Hult et al. |
| 5,787,546 A | 8/1998 | Bass et al. |
| 5,795,358 A | 8/1998 | Scanlon et al. |
| D398,425 S | 9/1998 | Hudson |
| D401,021 S | 11/1998 | Stephens et al. |
| D403,416 S | 12/1998 | Shelton et al. |
| 5,954,848 A | 9/1999 | Otto et al. |
| 5,966,774 A | 10/1999 | Bone et al. |
| 6,008,628 A | 12/1999 | Brotto |
| 6,018,231 A | 1/2000 | Shaver et al. |
| 6,075,341 A | 6/2000 | White et al. |
| 6,110,248 A | 8/2000 | Liu |
| D433,004 S | 10/2000 | Woodring et al. |
| 6,133,713 A | 10/2000 | Brotto |
| 6,154,007 A | 11/2000 | Shaver et al. |
| 6,154,008 A | 11/2000 | Bradus et al. |
| D435,707 S | 12/2000 | Leung |
| 6,160,447 A | 12/2000 | Huang |
| 6,172,487 B1 | 1/2001 | Brotto |
| 6,192,550 B1 | 2/2001 | Hamada et al. |
| D441,926 S | 5/2001 | Stratford |
| 6,256,834 B1 | 7/2001 | Meijer et al. |
| 6,269,518 B1 | 8/2001 | Yung |
| D448,894 S | 10/2001 | Yuen |
| D456,960 S | 5/2002 | Vandenbelt et al. |
| D458,424 S | 6/2002 | Chen |
| 6,434,785 B1 | 8/2002 | Vandenbelt et al. |
| 6,462,513 B1 | 10/2002 | Bradus et al. |
| 6,484,350 B2 | 11/2002 | Yung |
| D466,476 S | 12/2002 | Stratford |
| 6,493,903 B1 | 12/2002 | Super |
| D472,683 S | 4/2003 | Stratford |
| 6,546,592 B1 | 4/2003 | Cockburn et al. |
| 6,625,845 B2 * | 9/2003 | Hayashi et al. ................. 15/353 |
| D504,397 S | 4/2005 | Lodato et al. |
| D521,450 S | 5/2006 | Stratford |
| 7,673,369 B2 * | 3/2010 | Gogel et al. ..................... 15/352 |
| 2002/0069476 A1 | 6/2002 | Yung |
| 2002/0166199 A1 | 11/2002 | Boles et al. |
| 2003/0037403 A1 | 2/2003 | Lang |
| 2003/0221278 A1 | 12/2003 | Oh |
| 2005/0055795 A1* | 3/2005 | Zeiler et al. ...................... 15/353 |
| 2006/0137133 A1* | 6/2006 | Yik et al. ......................... 15/349 |
| 2007/0209148 A1* | 9/2007 | Yacobi et al. .................... 15/352 |
| 2007/0209150 A1* | 9/2007 | Gogel et al. ..................... 15/352 |
| 2009/0271944 A1* | 11/2009 | Lovelass ......................... 15/383 |

FOREIGN PATENT DOCUMENTS

| | | |
|---|---|---|
| DE | 1988318 | 6/1968 |
| DE | 1403128 | 11/1968 |
| DE | 6813511 | 12/1968 |
| DE | 1403131 | 2/1969 |
| DE | 1607730 | 9/1969 |
| DE | DT1964261 | 7/1970 |
| DE | 1611157 | 10/1970 |
| DE | DT1951306 | 11/1972 |
| DE | 3309162 | 9/1984 |
| DE | 3325336 | 1/1985 |
| DE | 8506818 | 8/1986 |
| DE | 8623695 | 11/1986 |
| DE | 8629781 | 4/1988 |
| DE | 3727980 | 3/1989 |
| DE | 9012439 | 12/1990 |
| DE | 4235745 | 4/1995 |
| DE | 3743083 | 8/1997 |
| DE | 19653570 | 9/1997 |
| DE | 197 04 468 A1 | 8/1998 |
| DE | 29814547 | 1/1999 |
| DE | 19733680 | 2/1999 |
| DE | 19903734 | 8/2000 |
| DE | 19925277 | 7/2001 |
| DE | 19959513 | 7/2001 |
| DE | 10110582 | 1/2002 |
| DE | 10056935 | 2/2002 |
| EP | 0008117 | 11/1985 |
| EP | 0170720 | 2/1986 |
| EP | 0160168 | 5/1989 |
| EP | 0116870 | 4/1990 |
| EP | 0215165 | 7/1991 |
| EP | 0468200 | 8/1993 |
| EP | 0444516 | 11/1994 |
| EP | 0548523 | 7/1995 |
| EP | 0674870 | 10/1995 |
| EP | 0914795 | 5/1999 |
| EP | 0983743 | 3/2000 |
| EP | 1023864 | 8/2000 |
| EP | 0921748 | 10/2000 |
| EP | 1070478 | 1/2001 |
| EP | 0749719 | 4/2001 |
| EP | 1 136 028 A | 9/2001 |
| EP | 0647114 | 11/2001 |
| EP | 1161915 | 12/2001 |
| FR | 1094603 | 5/1955 |
| WO | 0180704 | 11/2001 |
| WO | WO 02/38025 A | 5/2002 |

* cited by examiner

VACUUM CLEANER FILTER CLEANING MECHANISMS

FIELD OF THE INVENTION

The present invention relates to vacuum cleaners, and in particular to mechanisms for cleaning the filters of vacuum cleaners and vacuum cleaners comprising such mechanisms. Vacuum cleaners generally come in two main varieties, namely bagged and bagless vacuum cleaners, according to the technique they use to separate out dust and dirt from air which is drawn into the vacuum cleaner during operation. As the name implies, bagged vacuum cleaners comprise a porous bag. This is positioned with its mouth across an airflow pathway between a dirty air inlet of the vacuum cleaner and a clean air outlet therefrom, in order to capture dust and dirt entrained with the air as the air passes through the bag. Bagless vacuum cleaners on the other hand do not include a bag to intercept dust and dirt in this way, but instead use a technique for separating out dust and dirt from the incoming air which relies on inertial separation of the dust and dirt from the air, typically by applying a centrifugal force to the dust and dirt, such as in a cyclone. However, both the bagged and bagless varieties of vacuum cleaner very usually also include a filter, which operates in addition to these two main separation techniques, in order to increase the level of dust and dirt separation provided by the main separation technique alone. One or more such filters may be placed upstream or downstream of the main separation process, or in both upstream and downstream locations. The present invention is therefore equally applicable to both bagged and bagless varieties of vacuum cleaner. It is also equally applicable to larger floor-running vacuum cleaners of the cylinder and upright types, and to smaller hand-holdable vacuum cleaners, such as the present applicant's range of Dustbuster® hand-holdable vacuum cleaners.

BACKGROUND OF THE INVENTION

Regardless of the type of vacuum cleaner involved, however, any vacuum cleaner which includes a filter presents the problem that the filter will become progressively blocked with dust and dirt as the vacuum cleaner is used. This has the disadvantage of lowering the rate of air movement (i.e. volume of air moved per unit time) through the vacuum cleaner by obstructing the airflow during operation of the vacuum cleaner, thereby also reducing the overall cleaning efficiency of the vacuum cleaner. Accordingly, in order to ensure the continuing efficient operation of the vacuum cleaner, it is necessary for a user to clean the filter from time to time. In its most basic form, this means that the user manually removes the filter from the vacuum cleaner, washes or otherwise cleans it, and then replaces it back in the vacuum cleaner. However, this has the disadvantage that it requires the user to handle the dirty filter in order to clean it. A filter cleaning mechanism which, avoids this problem is therefore preferred to such manual cleaning.

BRIEF SUMMARY OF THE INVENTION

Figure 1A:
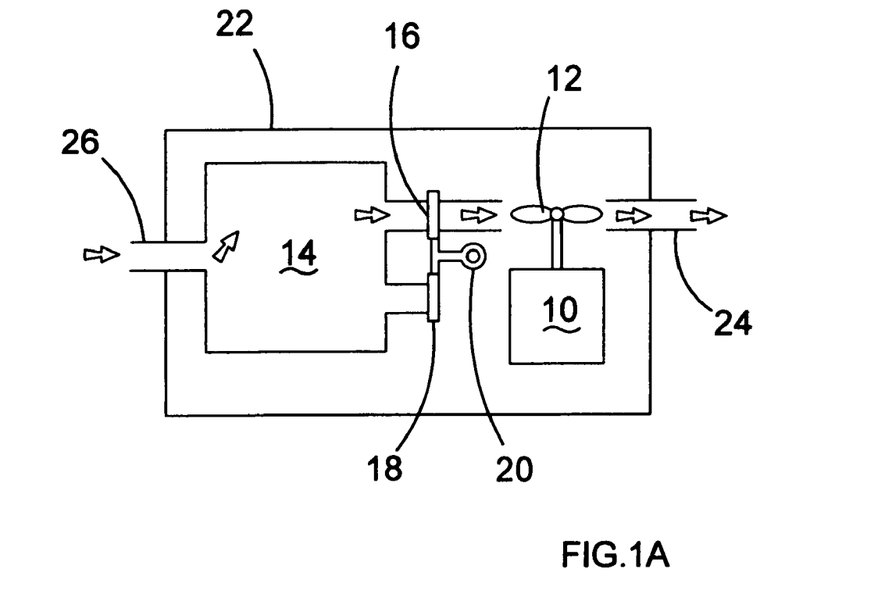
FIG. 1A schematically shows a prior art filter cleaning mechanism in a first mode of operation thereof.

Accordingly, several vacuum cleaner filter cleaning techniques which avoid the need for a user to handle a dirty filter are already known in the prior art. A first example is provided by the Electrolux® range of bagless cylinder vacuum cleaners with model numbers Z8220, Z8230 and Z8240, each of which permits a filter cleaning technique working as follows. As shown schematically in FIG. 1A, these vacuum cleaners comprise a motor 10 and a fan 12 driven by the motor 10 to move air through the vacuum cleaner from a dirty air inlet 26 via a main dirt separation device 14 (which in this case is a cyclone chamber) to a clean air outlet 24. However, these vacuum cleaners also comprise a pair of identical, mutually interchangeable filters 16, 18, which are mounted on a single, symmetrical assembly 20 within the body 22 of the vacuum cleaner. When this assembly 20 is in place, a first one 16 of the two filters is positioned across the flow of air through the vacuum cleaner between the main dirt separation device 14 and the clean air outlet 24. The second 18 of the two filters is also in fluid communication with the main dirt separation device 14, but not directly with the clean air outlet 24, so that air exiting the main dirt separation device 14 passes through the first filter 16 to the clean air outlet 24 in preference to passing through the second filter 18, as represented in FIG. 1A by the arrows. However, when the first filter 16 becomes blocked due to an excessive accumulation of dust and dirt thereon, a sensor also included in the vacuum cleaner detects a drop in the rate of air movement through the vacuum cleaner from the dirty air inlet 26 to the clean air outlet 24. This in turn illuminates a light mounted on the exterior of the vacuum cleaner body, which alerts the user to the fact that the first filter 16 needs cleaning. Without needing to touch the dirt-bearing parts of the dirty filter 16, the user can then swap the dirty filter 16 with the second, clean filter 18 by opening the body 22 of the vacuum cleaner, removing the symmetrical filter assembly 20, turning it through 180 degrees, and reinserting it into the vacuum cleaner with the second filter 18 now in the previous location of the first, dirty filter 16 and vice versa, as shown schematically in FIG. 1B. Thus the second filter 18, which at this stage is clean, will be introduced into the airflow pathway of dirty air through the vacuum cleaner to the clean air outlet 24 during normal operation thereof. Opening the body 22 of the vacuum cleaner to carry out this operation also has the effect of closing off the usual inlet 26 for dirty air to the main dirt separation device 14. Next, the user rotates the dirty first filter 16 by 360 degrees about its own axis. This activates a microswitch which operates the motor 10 to drive the air-moving fan 12. However, since at this stage, the body 22 of the vacuum cleaner remains open and the usual inlet 26 for dirty air to the vacuum cleaner's main dirt separation chamber 14 remains closed, air is drawn from the atmosphere backwards through the dirty filter 16 by the fan 12 into the main dirt separation chamber 14, as represented by the arrows shown in FIG. 1B, where the dirt from the dirty filter 16 is deposited. Once the dirty filter 16 has been rotated by a full 360 degrees, the microswitch is deactivated and the motor 10 shuts down. The filter cleaning operation being complete, the user may then close the body 22 of the vacuum cleaner once more, thereby re-opening the usual inlet 26 for dirty air to the vacuum cleaner's main dirt separation chamber 14, and the vacuum cleaner is once again ready for use.

Figure 1B:
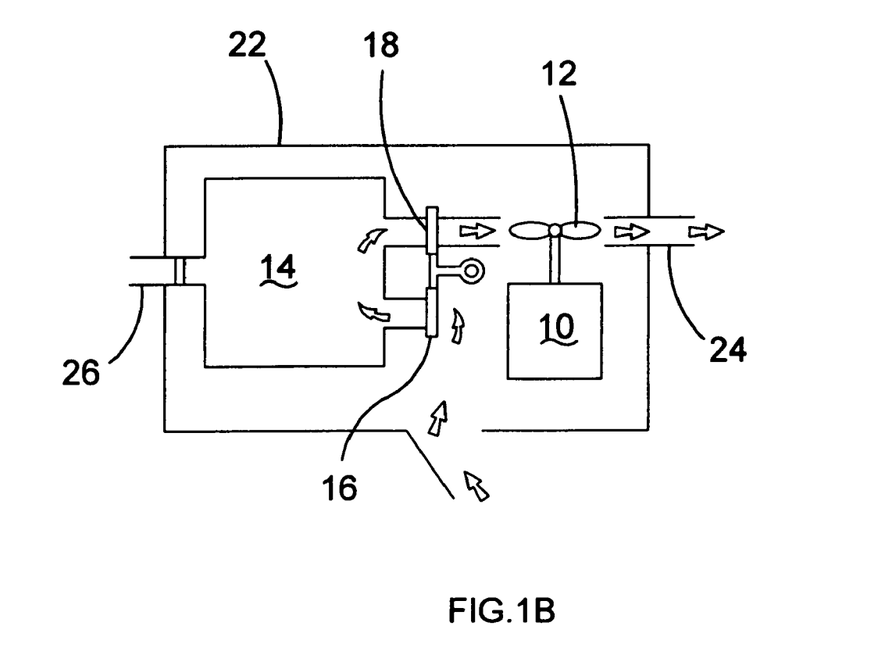
FIG. 1B schematically shows the prior art filter cleaning mechanism of FIG. 1A in a second mode of operation thereof.

Although this filter cleaning technique avoids the need for a user to handle the dirty filter in order to clean it, it has the disadvantage that the user must nonetheless open the vacuum cleaner and carry out a relatively complex sequence of operations, including removal and reinsertion of the filter assembly 20 into the body of the vacuum cleaner. The use of a pair of identical, interchangeable filters in this way instead of a single filter also increases the cost and complexity of manufacture. Moreover, the user can ignore the light mounted on the exterior of the vacuum cleaner which alerts the user to the fact that a filter cleaning operation should be carried out, which would result in insufficient filter cleaning, or carry out a filter cleaning operation when not required. Thus the frequency of filter cleaning is left entirely within the control of the user.

A second example of a known filter cleaning technique is disclosed in EP 1 523 916 A, also in the name of Black & Decker Inc. This document describes a hand-holdable vacuum cleaner having a dirt cup housing a two-stage filter, comprising a first, course filter for filtering courser dirt and contained within the course filter, a second, fine filter for filtering finer dust. The second, fine filter is provided with a plurality of tabs arranged in a ring, which interengage with a corresponding plurality of drive tabs mounted in a ring on a filter cleaning wheel. The filter cleaning wheel comprises a gripping portion which is partially exposed through an exterior housing of the vacuum cleaner. Thus when a user takes hold of the gripping portion and uses it to rotate the filter cleaning wheel, the drive tabs mounted thereon engage with the corresponding tabs of the fine filter and cause it to rotate within the course filter. The fine filter is pleated and the course filter is provided with a plurality of ribs formed on the inner surface thereof. Thus as the fine filter rotates within the course filter, the ribs formed on the inner surface of the course filter successively contact the pleats of the fine filter. This agitates the fine filter, causing any accumulated dust adhering to the fine filter to be shaken off, through the holes of the course filter and into the dirt cup, which may then be emptied. This filter cleaning technique has the advantage that unlike the Electrolux filter cleaning technique described above, the user does not need to carry out a whole sequence of operations in order to clean the fine filter or remove the filter from the vacuum cleaner in order to do so. However, since the filter cleaning wheel is manually operated, when to clean the filter is again left entirely at the user's discretion. There is therefore a risk that the user will either neglect to clean the fine filter so that dust continues to accumulate thereon, thereby diminishing the vacuum cleaner's efficiency, or will rotate the filter cleaning wheel more often than is necessary in order to clean the filter, thereby diminishing the lifetime of the fine filter by increasing the amount of wear on the pleats of the fine filter caused by the ribs formed on the inner surface of the course filter.

Finally, a third example of a known filter cleaning technique is described in EP 1 231 856 A in the name of TechTronic Industries Co., Ltd. This document discloses a vacuum cleaner having a dirt collection chamber which houses a filter element provided with a top plate having a protrusion formed thereon. A leaf spring positioned above the protrusion is maintained in a bent condition away from the protrusion by being compressed between two shoulders of a rectangular recess formed in the top wall of the dirt collection chamber. The underside of the leaf spring faces but does not contact the protrusion on the top plate of the filter element, which is exposed to the leaf spring through a central opening formed in the rectangular recess of the top wall. The upper surface of the leaf spring instead contacts an actuation member in the form of a hinged lever having an upwardly directed finger-piece and a downwardly directed nose. Thus when a user presses on the finger-piece, the nose of the actuation member pushes the leaf spring through an over-centre condition and the central region of the leaf spring moves sharply downwards into a convex configuration in which it impacts on the protrusion carried by the top plate of the filter element. This results in the filter element being shaken briefly to dislodge accumulated dust adhering to the filter element therefrom, and the dislodged dust falls into the dirt collection chamber, which can then be emptied. This filter cleaning technique also has the advantage that it does a user does not need to open the vacuum cleaner in order to clean the filter element, and that the user need only press a button to carry out the filter cleaning operation. However, since the leaf spring only comes into contact with the top plate of the filter element once when the finger-piece of the actuation member is depressed, the filter element is also only shaken once, and there remains a risk that much dust will remain adhered to the filter. Moreover, once again, since when to clean the filter element is left entirely at the user's discretion, there also remains a risk that the user will forget to clean the filter element as often as is required, so that dust continues to accumulate thereon, thereby diminishing the vacuum cleaner's efficiency.

As may be seen, therefore, all of the prior art filter cleaning techniques described above have at least the disadvantage that they all leave the timing of when to perform a filter cleaning operation entirely within the control of the user of the vacuum cleaner. This presents the risk that the user will either forget to clean the filter often enough, resulting in reduced efficiency of the vacuum cleaner, or will clean the filter more often than is required, resulting in increased wear on the filter elements. Accordingly, it is an object of the present invention to provide a vacuum cleaner filter cleaning technique which avoids this problem in order to result in effective cleaning of the filter at regular intervals over the operational lifetime of the filter, but which also avoids the need for a user to handle a dirty filter in order to clean it and which obviates the need for a user to open the vacuum cleaner in order to clean the filter or to carry out a complex sequence of operations in order to do so.

In one aspect, the present invention aims to achieve this object by providing a vacuum cleaner comprising an inlet for dirty air; an outlet for clean air; a filter located in fluid communication between the inlet and the outlet; a motor; a fan driven by the motor for moving air from the inlet through the filter to the outlet; an electrical power supply for supplying power to the motor; an on/off switch for placing the motor in powered electrical connection with the fan and having a first state wherein the motor drives the fan and a second state wherein the motor does not drive the fan; and a filter cleaning mechanism for removing dirt from the filter; wherein activation of the filter cleaning mechanism is operatively associated with the on/off switch, whereby operation of the on/off switch results in operation of the filter cleaning mechanism.

Thus the filter is only cleaned when the vacuum cleaner's on/off switch is operated. This means that the frequency of filter cleaning is related directly to the amount of usage of the vacuum cleaner, so that the filter is cleaned neither too often nor too infrequently, but just often enough.

The vacuum cleaner may further comprise a timing device, wherein operation of the on/off switch from the first state to the second state activates the filter cleaning mechanism and the timing device, and the timing device subsequently deactivates the filter cleaning mechanism. Thus each time the vacuum cleaner is switched off after having been used, the filter cleaning mechanism is activated for a short time until deactivated again by the timing device, thereby cleaning the filter ready for use next time.

Alternatively, the vacuum cleaner may further comprise a timing device, wherein operation of the on/off switch from the second state to the first state activates the filter cleaning mechanism and the timing device, whereupon the timing device delays the motor from driving the fan, and the timing device subsequently deactivates the filter cleaning mechanism and ends the delay of the motor driving the fan. Thus each time the vacuum cleaner is switched on for use, the filter cleaning mechanism is activated for a short time until deactivated again by the timing device before the motor starts to drive the fan, thereby cleaning the filter before it is used.

In a third possible embodiment, the on/off switch has a third state wherein the motor does not drive the fan, operation of the on/off switch from the first state to the second state activates the filter cleaning mechanism and operation of the on/off switch from the second state to the third state deactivates the filter cleaning mechanism. Thus each time the vacuum cleaner is switched off after having been used, the filter cleaning mechanism is activated for a short time until deactivated again by the user operating the switch into its third state, thereby cleaning the filter ready for use next time.

Finally, in a fourth possible alternative embodiment of the first aspect of the invention, the on/off switch has a third state wherein said motor does not drive said fan, operation of said on/off switch from the second state to the third state activates said filter cleaning mechanism and operation of said on/off switch from the third state to the first state deactivates said filter cleaning mechanism. Thus each time the vacuum cleaner is switched on for use, the filter cleaning mechanism is activated for a short time until deactivated again by the user operating the switch into its first state wherein the motor starts to drive the fan, thereby cleaning the filter before it is used.

In a second aspect, the present invention also provides a vacuum cleaner comprising an inlet for dirty air; an outlet for clean air; a filter located in fluid communication between the inlet and the outlet; a motor; a fan driven by the motor for moving air from the inlet through the filter to the outlet; an electrical power supply for supplying power to the motor; and a filter cleaning mechanism for removing dirt from the filter; wherein the filter cleaning mechanism is electrically powered; and the vacuum cleaner further comprises a user-operated switch for activating the filter cleaning mechanism, whereby operation of the switch results in operation of the filter cleaning mechanism.

Thus a user of the vacuum cleaner may clean the filter merely by operating the switch without the need to carry out a complex sequence of operations, or remove the filter from the vacuum cleaner in order to do so.

In one possible embodiment of the second aspect of the invention, the switch has a first state in which the filter cleaning mechanism is activated and a second state in which the filter cleaning mechanism is de-activated, and the switch latches in the first and second states thereof unless operated. Thus a user may switch the filter cleaning mechanism on and off by operating the switch each time.

In a second possible alternative embodiment of the second aspect of the invention, the switch has a first state in which the filter cleaning mechanism is activated and a second state in which the filter cleaning mechanism is de-activated, and the switch is monostable in the second state thereof, but must be held by a user in the first state thereof. Thus in order to operate the filter cleaning mechanism, the user must hold the switch in the second state and the filter cleaning mechanism will only continue to operate for as long as the switch is held in this fashion.

Finally, in a third possible alternative embodiment of the second aspect of the invention, the vacuum cleaner may further comprise a timing device, wherein operation of the switch activates the filter cleaning mechanism and the timing device, and the timing device subsequently deactivates the filter cleaning mechanism. Thus in order to operate the filter cleaning mechanism, the user need only operate the switch once, which will activate the filter cleaning mechanism for a short time until it is deactivated again by the timing device.

BRIEF DESCRIPTION OF THE DRAWINGS

Further features and advantages of the present invention will become apparent from the following detailed description, which is given by way of example and in association with the accompanying drawings, in which.

DETAILED DESCRIPTION OF THE INVENTION

Figure 2:
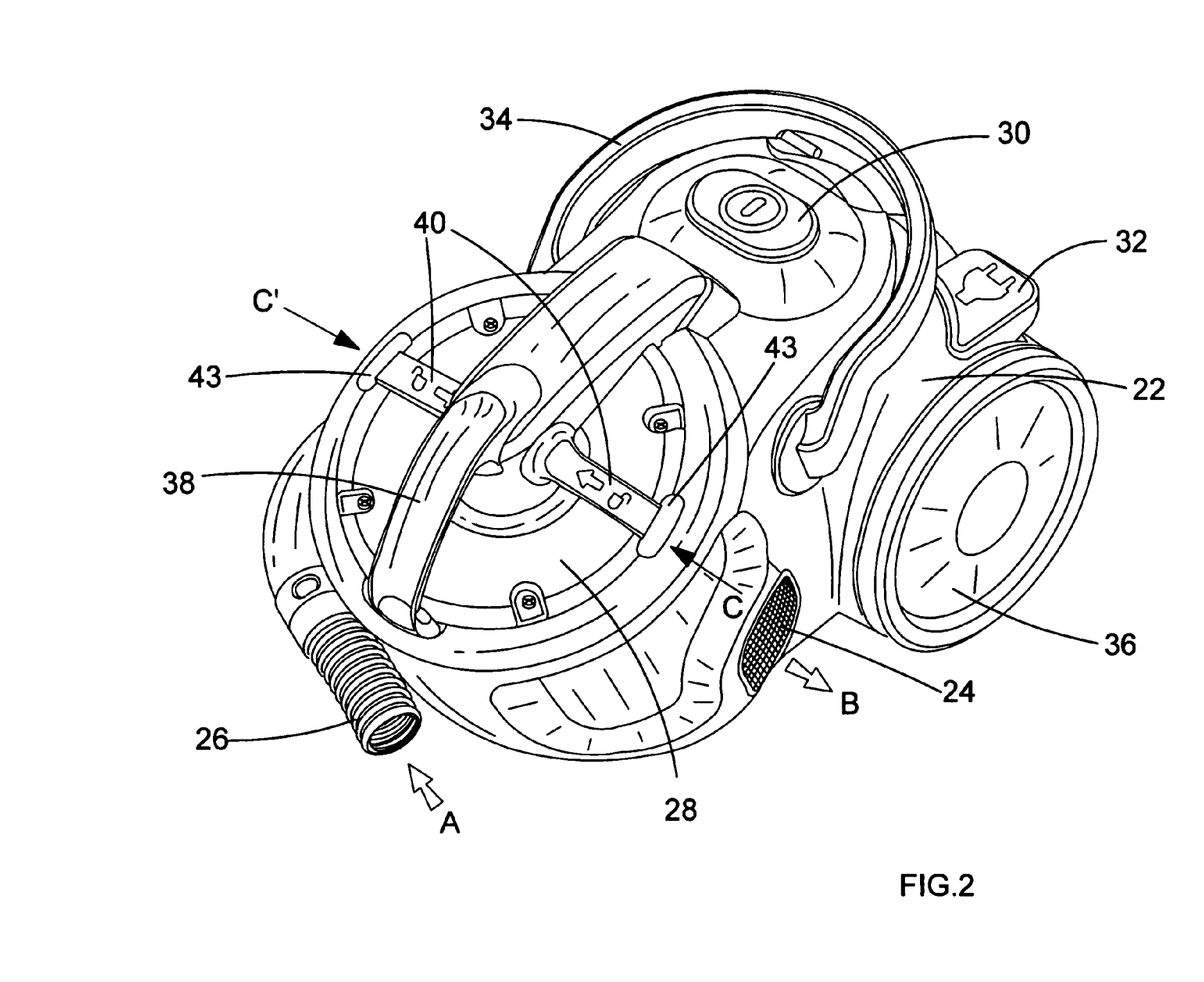
FIG. 2 is a perspective view of a vacuum cleaner with a removable dust collection chamber having a filter cleaning mechanism according to a first embodiment of the present invention.

Referring firstly to FIG. 2, there is shown the body 22 of a vacuum cleaner comprising a removable dust collection chamber 28. The removable dust collection chamber 28 includes a dirt separation device which will be described in greater detail below. Dirty air enters the vacuum cleaner via a dirty air inlet 26, passes through the dirt separation device and exits the vacuum cleaner via a pair of clean air outlets 24 provided on opposite sides of the body 22 of the vacuum cleaner, in the manner illustrated by the arrows labelled A and B in FIG. 2. Because of the orientation of the vacuum cleaner body as shown in FIG. 2, only one of the clean air outlets 24 can be seen in this drawing. A hose and floor-cleaning head (or other similar accessory, such as an upholstery brush or crevice tool), which would normally be attached to the dirty air inlet 26, have also been omitted from FIG. 2 for the purposes of greater clarity in the illustration. The vacuum cleaner is switched on and off by a user depressing an on/off switch 30 mounted on the top of the body 22. Mains electrical power is supplied to the vacuum cleaner by a cable (not shown) which enters the body 22 via an access point on the rear of the body. The cable is wound onto a spring-loaded and ratcheted drum within the body 22, and may be retracted back into body by a user depressing a cable-rewind button 32, which disengages the ratchet, allowing the cable to return into the body under the action of the spring. A pivoting handle 34 allows the user to pick up body 22, which is also provided with wheels (only one of which can be seen in FIG. 2) for moving the vacuum cleaner across a floor. A further handle 38 provided on the dust collection chamber 28 allows a user to remove the dust collection chamber 28 from body 22 for emptying dust and dirt therefrom, but in order to do so, the user must firstly release the dust collection chamber from body 22 by squeezing a pair of spring-loaded levers 40 in the directions indicated in FIG. 2 by the arrows labelled C and C'. This action disengages the ends of levers 40 from beneath a pair of overhanging tabs 43 provided on body 22 and allows the dust collection chamber 28 then to be lifted out of body 22 using handle 38 in a direction towards the viewer.

Figure 3:
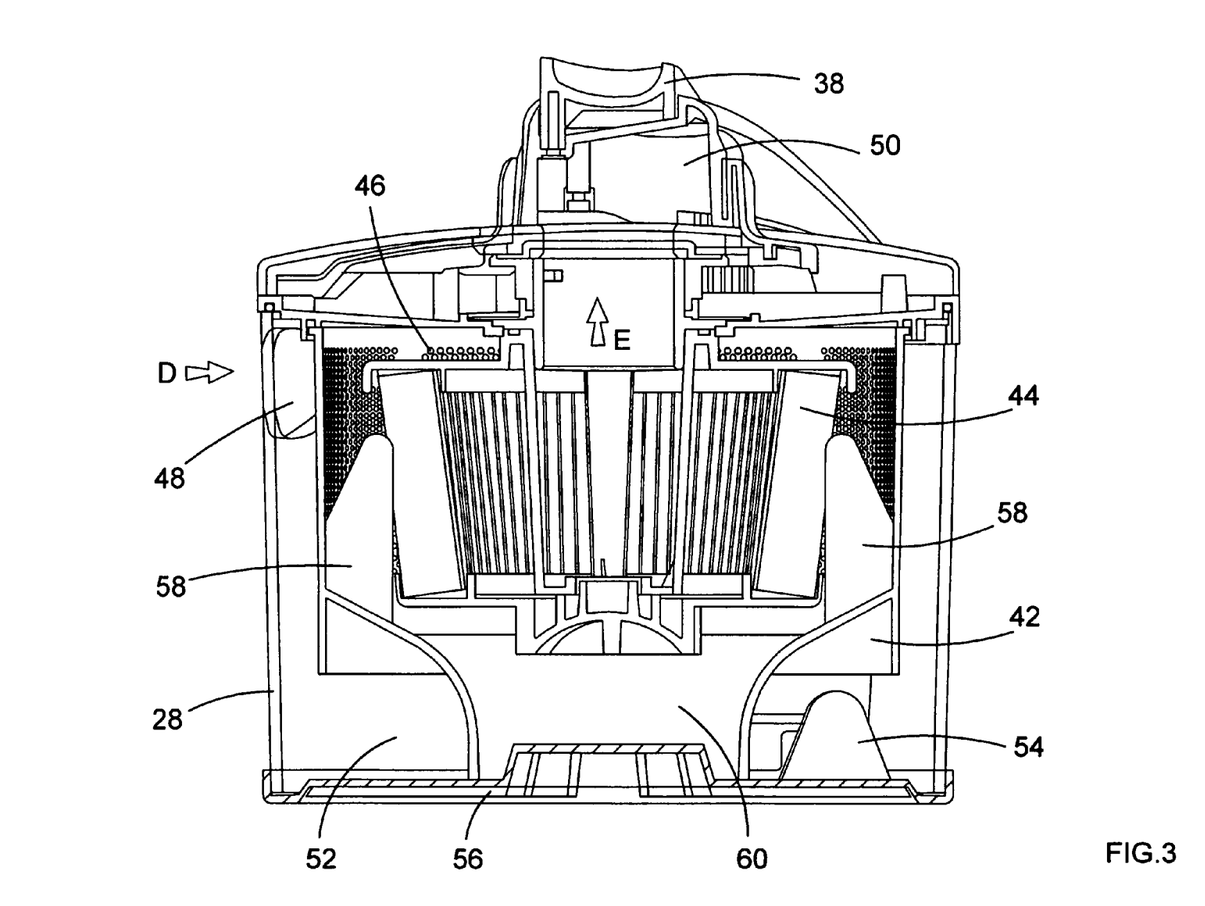
FIG. 3 is a cross-sectional view through the removable dust collection chamber of the vacuum cleaner shown in FIG. 2.

Turning now to FIG. 3, there is shown a cross-sectional view through the dust collection chamber 28. The dust collection chamber includes a dirt separation device comprising a course filter 42 and a pleated fine filter 44. The course filter 42 is made of a rigid plastics material and includes a large number of small holes 46. The pleated fine filter 44 is made of a porous woven material and may also be provided with a non-stick coating on the outer surface thereof. During operation of the vacuum cleaner, dirty air enters the dust collection chamber from the dirty air inlet 26 via an aperture 48 formed in a side wall of the dust collection chamber 28 in the direction indicated by the arrow labelled D in FIG. 3. The dirty air then swirls around the outside of course filter 42, with dust and dirt being thrown outwardly under the action of centrifugal force and air being drawn inwardly through the large number of small holes 46 formed in the course filter 42, which prevent the passage of any remaining large dirt particles therethrough. The partially filtered air then passes through the pleated fine filter 44, which captures remaining fine particles of dust, and clean air exits the dust collection chamber 28 in the direction indicated by the arrow labelled E in FIG. 3. Handle 38 incorporates a hollow passage 50 placing the dust collection chamber 28 in fluid communication with the main body 22 of the vacuum cleaner. Filtered air therefore passes along hollow passage 50 from the dust collection chamber 28 to body 22. The body 22 houses a motor and a fan driven by the motor, which during operation of the vacuum cleaner, generates the movement of air through the dust collection chamber 28 into the body 22 just described. Meanwhile, dust and dirt separated out from the air collect in the bottom of the dust collection chamber 28 under the action of gravity, in the region indicated in FIG. 3 by reference numeral 52. A series of baffles 54 formed in the bottom of the dust collection chamber 28 help to trap the dust and dirt. The bottom of the dust collection chamber 28 is also provided with a trap-door 56 which can be opened by a user in order to empty the dust collection chamber, in a manner to be described in greater detail below.

Whereas large particles of dirt which are caught by the course filter 42 are heavy enough to fall to the bottom of the dust collection chamber 28 under their own weight, fine particles of dust which are caught by the pleated fine filter 44 adhere thereto and must therefore be dislodged in order to prevent the pleated fine filter from becoming blocked. This is achieved in the following fashion. The inner surface of the course filter 42 is provided with a plurality of ribs 58 which interengage with the pleats of the fine filter 44. The fine filter 44 is free to rotate within the dust collection chamber 28 relative to the course filter 42, and may be caused to do so in a manner which will be described shortly in relation to FIG. 4. Thus as the fine filter 44 rotates within the course filter 42, the ribs 58 formed on the inner surface of the course filter successively contact the pleats of the fine filter 44. This agitates the fine filter, causing any accumulated dust adhering to the fine filter to be shaken off and to fall to the bottom of the dust collection chamber. The non-stick coating formed on the outer surface of the fine filter aids in this process. The dislodged dust then collects in the region indicated in FIG. 3 by reference numeral 60, and can be emptied from the dust collection chamber by a user opening trap-door 56.

Figure 4:
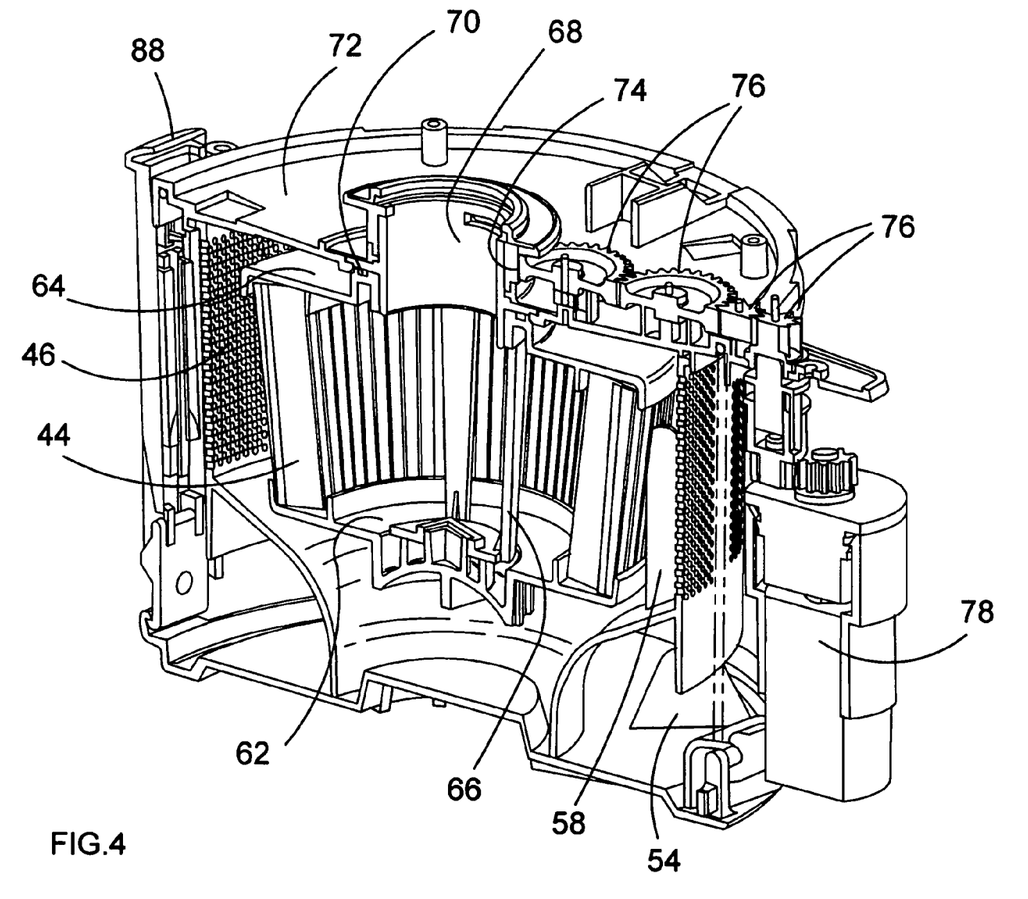
FIG. 4 is a partially cut-away perspective view of the dust collection chamber shown in FIG. 3, illustrating certain aspects of the filter cleaning mechanism.
Figure 5:
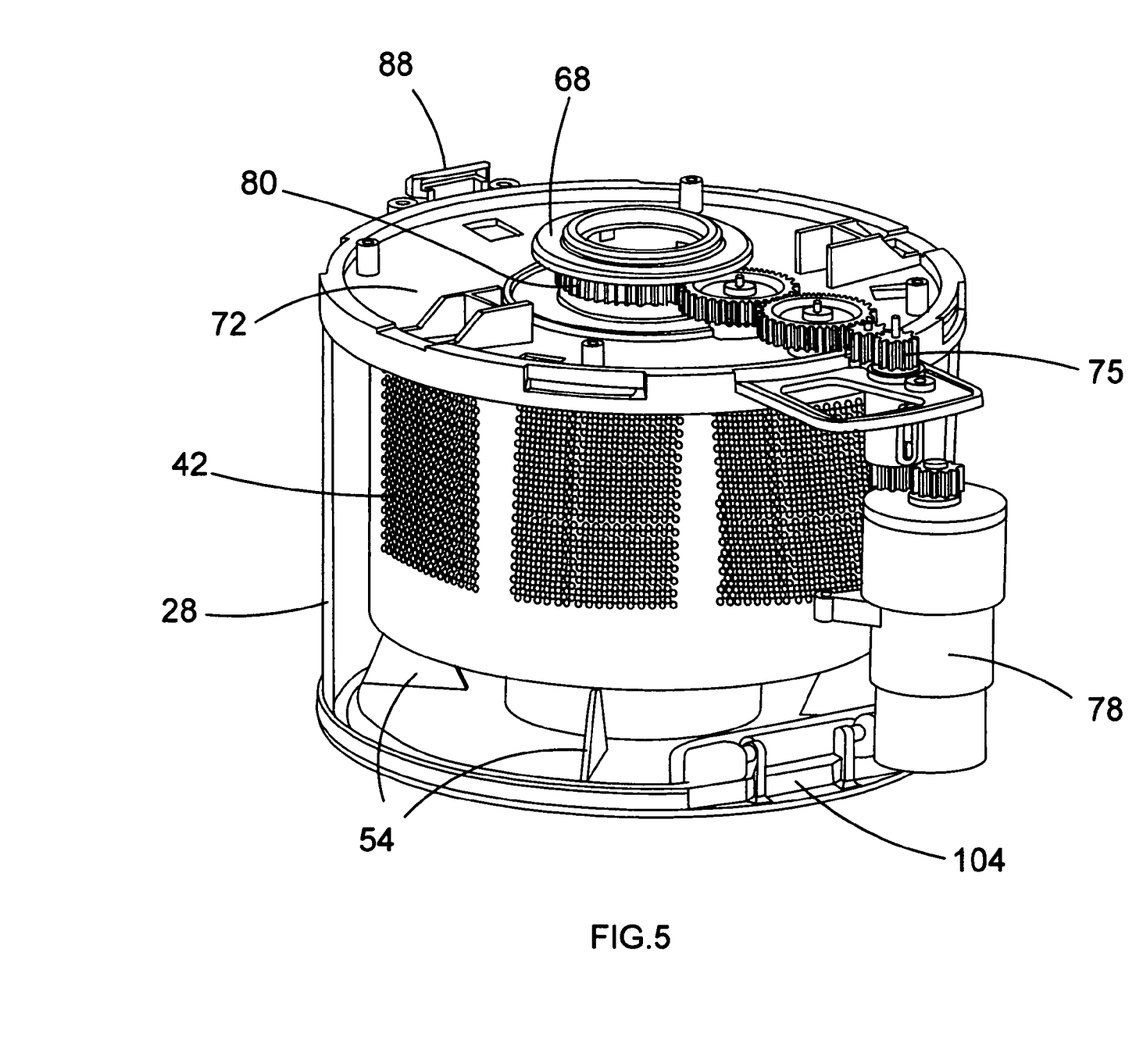
FIG. 5 is a perspective view of the dust collection chamber shown in FIG. 3, illustrating other aspects of the filter cleaning mechanism.

Turning now to FIG. 4, the filter cleaning mechanism which allows fine filter 44 to be cleaned in this manner will now be described. The pleats of the fine filter 44 are mounted in a frame comprising a bottom portion 62 and a top portion 64 connected to each other by pillars 66. Top portion 64 of this frame is fixed to a rotatable hub 68 in a ring, the cross-section of this ring being indicated in FIG. 4 by reference numeral 70. The rotatable hub 68 is free to rotate about its own axis within the lid of the dust collection chamber 28. The lid of the dust collection chamber is itself hollow and comprises a lower surface (labelled 72 in FIG. 4) and an upper surface, which has been removed in FIG. 4 in order to reveal a train of gears 76 contained within the hollow space of the lid. Rotatable hub 68 is also provided with a plurality of gear teeth on its outer surface, which are not visible in FIG. 4, but which may instead be seen in FIG. 5, where they are labelled by reference numeral 80. These gear teeth 80 successively contact a first wheel of the train of gears 76 at the point indicated in FIG. 4 by reference numeral 74. The train of gears 76 is in turn driven by a motor 78, which is a second motor of the vacuum cleaner, additional to the motor mounted in the body 22 which drives the fan for drawing air through the vacuum cleaner during operation thereof. Instead, the second motor 78 is dedicated to operating the filter cleaning mechanism by causing hub 68 to rotate, thereby also indirectly rotating the fine filter 44 and causing the pleats thereof to successively contact the ribs 58 formed on the inner surface of the course filter 42.

Figure 6:
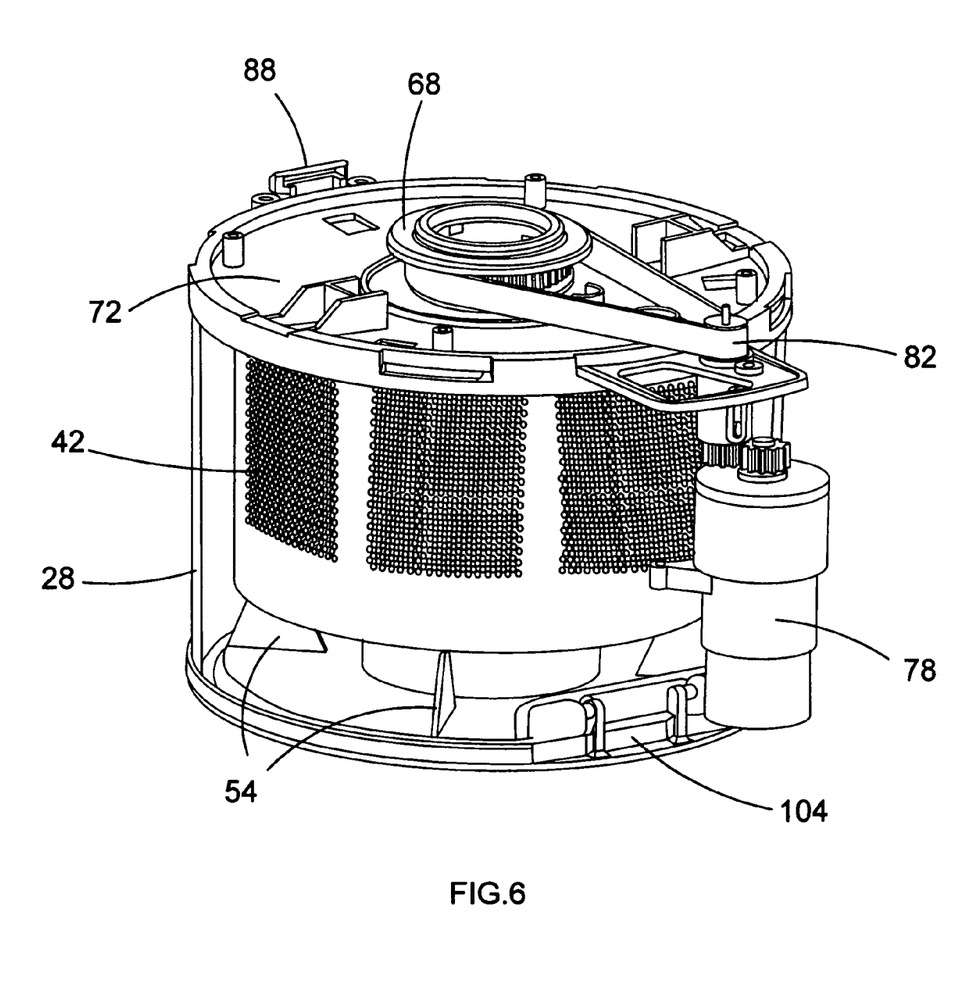
FIG. 6 is a perspective view of a removable dust collection chamber of a vacuum cleaner comprising a filter cleaning mechanism according to a second embodiment of the present invention.

In the alternative embodiment shown in FIG. 6, in place of the train of gears 76, the gear teeth 80 formed around the outside of rotatable hub 68 may instead engage with teeth provided on the inside of a rubber drive belt 82 for transmitting rotary motion from the second motor 78 to the hub 68. In either embodiment, however, second motor 78 is permanently mounted to the exterior of dust collection chamber 28, so that when the dust collection chamber is removed from the body 22 of the vacuum cleaner by a user in order to allow it to be emptied, the motor and drive train for transmitting rotary motion from the motor to the hub remain undisturbed.

The source of power for motor 78 may be the same as the source of power for the main motor of the vacuum cleaner which drives the fan for moving air through the vacuum cleaner from the dirty air inlet to the clean air outlet. Alternatively, the second motor 78 may have its own separate source of power. Motor 78 may also be battery powered or mains powered. In the event that it is battery powered, the battery may be permanently in electrical connection with the motor and also mounted to the exterior of dust collection chamber 28. Alternatively, however, the battery may instead be housed within the body 22 of the vacuum cleaner and electrically connected to the motor via electrical contact points only when dust collection chamber 28 is docked into body 22. A similar arrangement by which electrical power is supplied to motor 78 via electrical contacts can also be used in the event that motor 78 is mains powered. In a further alternative embodiment, the filter cleaning mechanism may be driven by the main motor of the vacuum cleaner which drives the fan for moving air through the vacuum cleaner from the dirty air inlet to the clean air outlet, without the need for second motor 78. In such a case, the power output from the main motor must be moderated by suitable gearing and/or control circuitry to ensure that the lower power demands of the filter cleaning mechanism and the higher power demands of the fan may both be met by the same motor.

Figure 7:
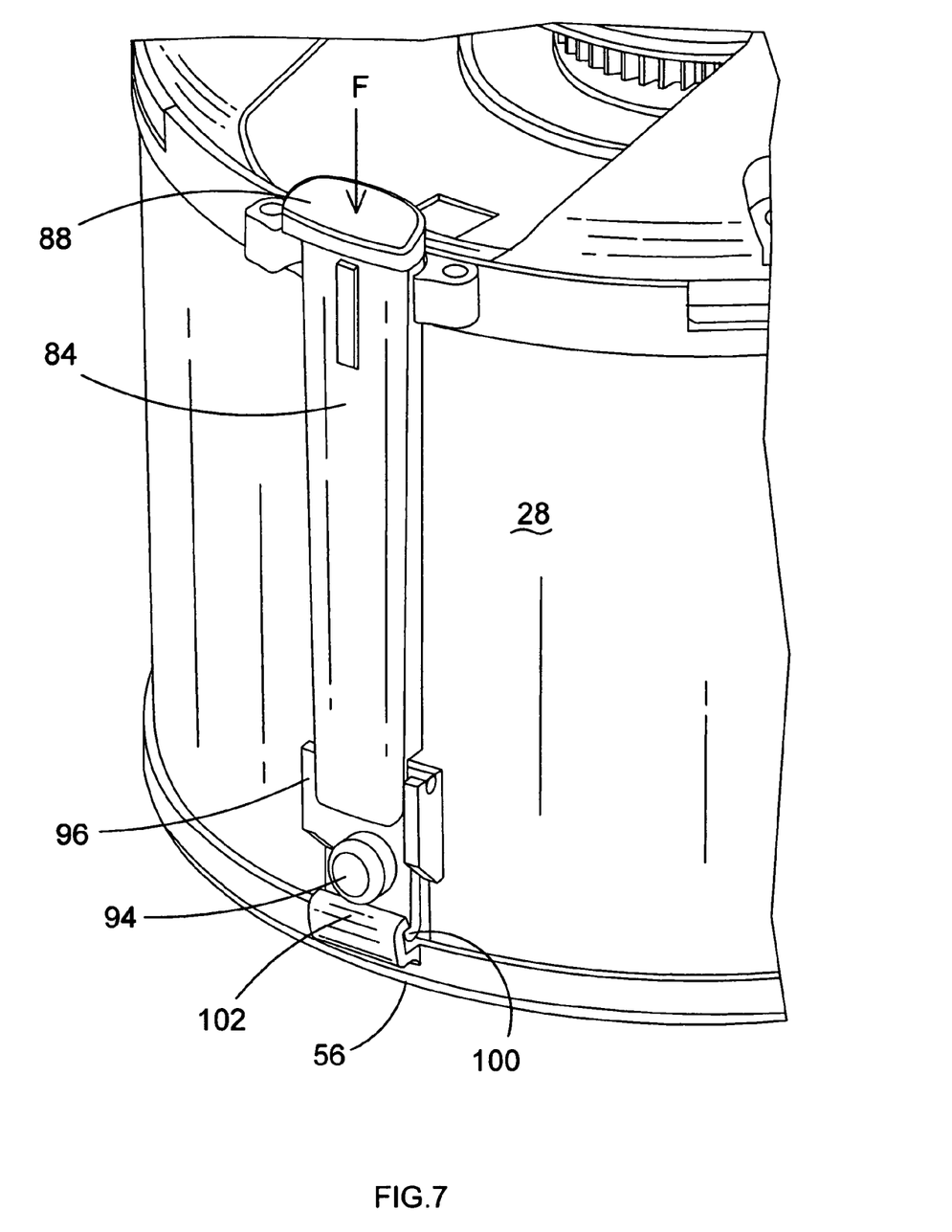
FIG. 7 is a close-up view of a part of the dust collection chamber of either the first or second embodiment, showing a bowl release mechanism.
Figure 8:
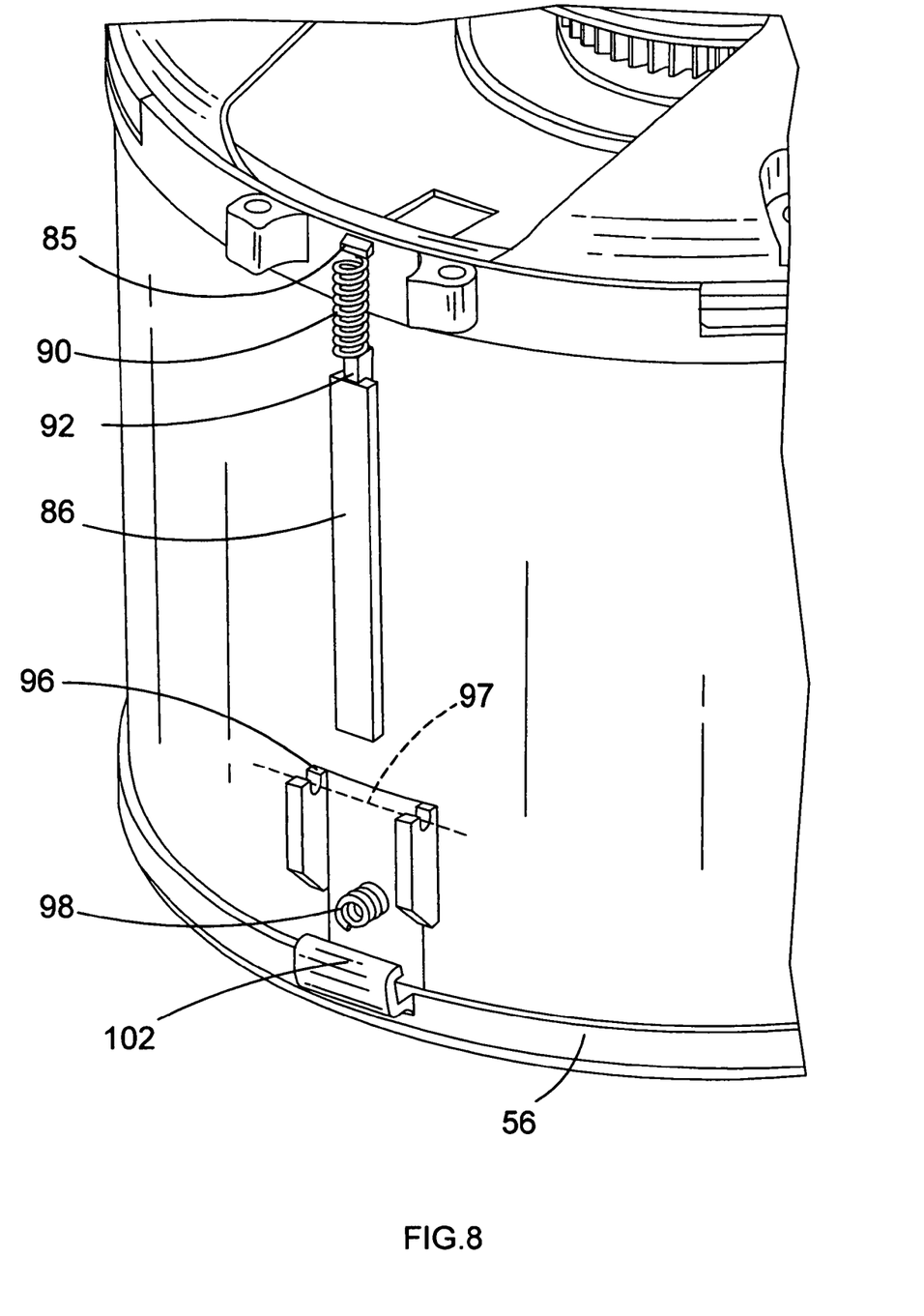
FIG. 8 is a similar view to FIG. 7 with some of the components of the bowl release mechanism removed for the purposes of illustration and explanation.
Figure 9A:
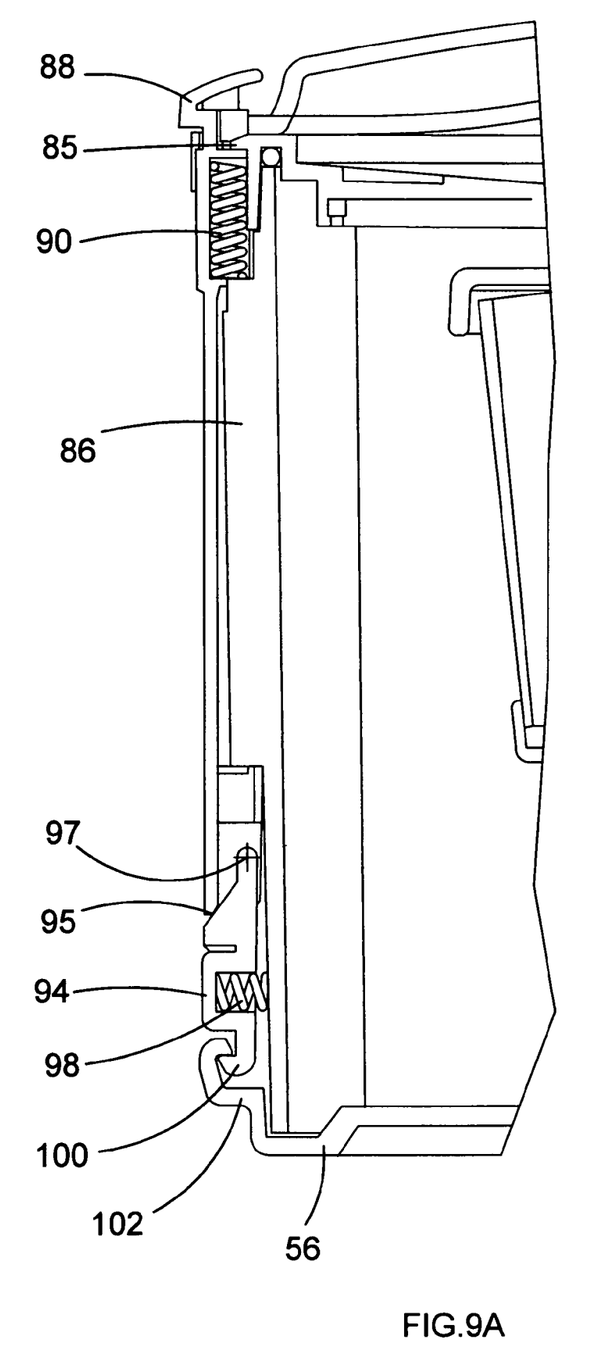
FIG. 9A is a partial cross-sectional view of the bowl release mechanism of FIG. 7 in a first position thereof.
Figure 9B:
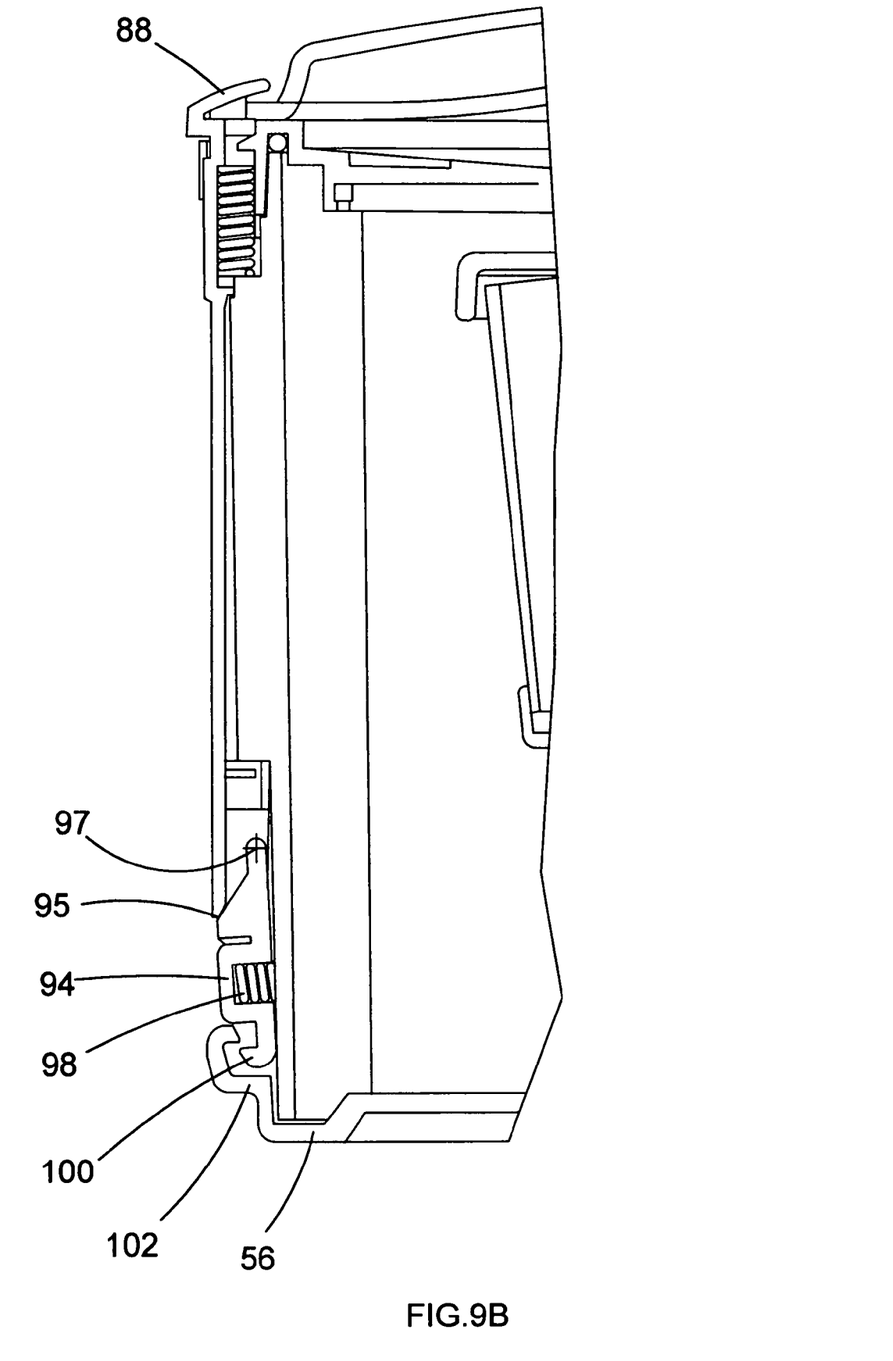
FIG. 9B is a partial cross-sectional view of the bowl release mechanism of FIG. 7 in a second position thereof.

How the trap-door 56 on the bottom of dust collection chamber 28 is opened by a user, in order to allow the dust collection chamber to be emptied, will now be described with reference to FIGS. 7 and 8. Mounted on the side of dust collection chamber 28 is a plunger 84, which slides on a guide rail 86. At the top end of plunger 84 is a push-button 88, which allows the user to depress the plunger in the direction indicated in FIG. 7 by arrow F, against the force of a first compression spring 90 (shown in FIG. 8) which is mounted on a spring buffer 92 and is held in place by engagement with a retaining pip 85. When the plunger 84 is depressed in this manner, the bottom end of plunger 84 pushes against a latch 94 held in a hinge mounting 96, the plunger 84 coming into contact with the latch 94 at a point of contact indicated in FIGS. 9A and 9B by reference numeral 95. The hinge mounting 96 provides an axis of rotation 97 (as shown in FIG. 8), about which the latch 94 is able to pivot. The pressure applied to latch 94 by the bottom end of plunger 84 therefore causes latch 94 to rotate about the axis 97 against the force of a second compression spring 98 mounted on the side of dust collection bowl 28. The end of latch 94 remote from axis 97 is also provided with a retaining lip 100, which is able to engage with a catch 102 formed on trap-door 56. On the opposite side of trap-door 56 from catch 102, the trap-door 56 is mounted to dust collection chamber 28 via a spring-loaded hinge 104, which may be seen in both FIGS. 5 and 6. Thus when latch 94 rotates about axis 97 against the force of the second compression spring 98, retaining lip 100 is disengaged from catch 102 and trap-door 56 swings open under the spring force of hinge 104, thereby emptying accumulated dust and dirt from within the dust collection chamber 28.

The trap-door 56 may also be opened by a user pushing directly on latch 94, which is also provided with a push-button for that purpose, without the need for the user to depress plunger 84 in order to do so. However, when the user releases the pressure placed on latch 94 either by releasing the pressure applied to it directly or by releasing the pressure previously applied to push-button 88, plunger 84 and latch 94 return to their starting positions under the action of the two compression springs 90 and 98. The user is then able to close trap-door 56 again by swinging it shut against the spring force of hinge 104, until catch 102 re-engages with the retaining lip 100 of latch 94. The relaxed and compressed states of compression springs 90 and 98 are respectively shown in FIGS. 9A and 9B.

The invention claimed is:

1. A vacuum cleaner comprising:
    an inlet for dirty air;
    an outlet for clean air;
    a first filter located in a removable dust collection chamber in fluid communication between said inlet and said outlet;
    a first motor;
    a fan driven by said first motor for moving air from said inlet through said first filter to said outlet;
    an electrical power supply for supplying power to said motor;
    a second motor secured to and removable with the dust collection chamber, the second motor capable of actuating a filter cleaning mechanism for removing dirt from the first filter;
    activation of said filter cleaning mechanism is operatively associated with an on/off switch having a first state that turns on said first motor and a second state that turns off said first motor.

2. The vacuum cleaner according to claim 1 further comprising a timing device, wherein operation of said on/off switch from the first state to the second state activates said filter cleaning mechanism and said timing device, and said timing device subsequently deactivates said filter cleaning mechanism.

3. The vacuum cleaner according to claim 1 further comprising a timing device, wherein operation of said on/off switch from the second state to the first state activates said filter cleaning mechanism and said timing device, whereupon said timing device delays activation of said first motor, and said timing device subsequently deactivates said filter cleaning mechanism and ends the delay of said first motor.

4. The vacuum cleaner according to claim 1, wherein the on/off switch has a third state wherein said first motor does not drive said fan, operation of said on/off switch from the first state to the second state activates said filter cleaning mechanism and operation of said on/off switch from the second state to the third state deactivates said filter cleaning mechanism.

5. The vacuum cleaner according to claim 1, wherein the on/off switch has a third state wherein said motor does not drive said fan, operation of said on/off switch from the second state to the third state activates said filter cleaning mechanism and operation of said on/off switch from the third state to the first state deactivates said filter cleaning mechanism.

6. A vacuum cleaner according to claim 1, wherein the first filter is pleated and is located inside a second coarse filter, and wherein the filter cleaning mechanism comprises the coarse filter having a plurality of ribs which engage with said pleats, a hub on said first filter about which said first filter is able to rotate relative to said ribs, a source of rotary motion, and means for transferring rotary motion from said source to said hub.

7. The vacuum cleaner according to claim 6, wherein said means for transferring rotary motion is a train of gears.

8. The vacuum cleaner according to claim 6, wherein said means for transferring rotary motion is a rubber belt.

9. The vacuum cleaner according to claim 6, further comprising a second battery additional to said electrical power supply and which second battery is dedicated to supplying power to said second motor.

10. The vacuum cleaner according to claim 1, wherein said electrical power supply comprises a mains electrical cable.

11. The vacuum cleaner according to claim 1, wherein said electrical power supply comprises a first battery.

12. A vacuum cleaner comprising:
    an inlet for dirty air;
    an outlet for clean air;
    a first filter located in a removable dust collection chamber in fluid communication between said inlet and said, outlet;
    a motor secured to and removable with the dust collection chamber;
    an electrical power supply for supplying power to said motor; and
    a filter cleaning mechanism for removing dirt from said filter powered by said motor and having a user-operated switch for activating said filter cleaning mechanism.

13. The vacuum cleaner according to claim 12, wherein said switch has a first state in which said filter cleaning mechanism is activated and a second state in which said filter cleaning mechanism is de-activated, and said switch is monostable in the second state thereof, but must be held by a user in the first state thereof.

14. The vacuum cleaner according to claim 12 further comprising a timing device, wherein operation of said switch activates said filter cleaning mechanism and said timing device, and said timing device subsequently deactivates said filter cleaning mechanism.

15. The vacuum cleaner according to claim 12, wherein the first filter is pleated and is positioned inside a second filter having;

a plurality of ribs which engage with said pleats;
said first filter having a hub that is driven by said motor to rotate about the second filter.

16. The vacuum cleaner according to claim 15, wherein said motor is connected to the hub through a train of gears.

17. The vacuum cleaner according to claim 15, wherein said motor is connected to the hub through a rubber belt.

18. The vacuum cleaner according to claim 15, wherein said first filter is a fine dust filter and said ribs are mounted on an inner surface of the second filter surrounding said first filter.

19. The vacuum cleaner according to claim 12, wherein said electrical power supply comprises a mains electrical cable.

20. The vacuum cleaner according to claim 12, wherein said electrical power supply comprises a first battery.

* * * * *